(12) United States Patent
Sakata

(10) Patent No.: US 7,471,663 B2
(45) Date of Patent: Dec. 30, 2008

(54) RADIO NETWORK CONTROLLER AND MOBILE COMMUNICATION SYSTEM USING THE SAME

(75) Inventor: Masayuki Sakata, Tokyo (JP)

(73) Assignee: NEC Corporation (JP)

( * ) Notice: Subject to any disclaimer, the term of this patent is extended or adjusted under 35 U.S.C. 154(b) by 773 days.

(21) Appl. No.: 11/016,755

(22) Filed: Dec. 21, 2004

(65) Prior Publication Data

US 2005/0152389 A1   Jul. 14, 2005

(30) Foreign Application Priority Data

Jan. 14, 2004  (JP) ............................... 2004-006182

(51) Int. Cl.
*H04Q 7/24* (2006.01)
(52) U.S. Cl. ...................... 370/338; 370/329; 370/335; 370/341; 370/342
(58) Field of Classification Search ................. 370/328, 370/329, 331, 332, 335, 342, 341, 431, 441, 370/469
See application file for complete search history.

(56) References Cited

U.S. PATENT DOCUMENTS

| | | | | |
|---|---|---|---|---|
| 2001/0018345 A1* | 8/2001 | Longoni et al. | ............. | 455/436 |
| 2005/0068967 A1* | 3/2005 | Terry et al. | ............. | 370/395.52 |
| 2005/0193309 A1* | 9/2005 | Grilli et al. | ................. | 714/752 |
| 2006/0120530 A1* | 6/2006 | Vialen et al. | ................ | 380/270 |
| 2006/0140158 A1* | 6/2006 | Terry | .......................... | 370/335 |
| 2007/0189223 A1* | 8/2007 | Hwang | ....................... | 370/331 |
| 2008/0070611 A1* | 3/2008 | Yi et al. | ...................... | 455/515 |

FOREIGN PATENT DOCUMENTS

EP   1 367 841 A2   12/2003

OTHER PUBLICATIONS

3GPP TS 25.321 V3.15.0 (Mar. 2003); "3rd Generation Partnership Project: Technical Specification Group Radio Access Network; Medium Access Control (MAC) protocol specification (Release 1999)".

\* cited by examiner

*Primary Examiner*—Ajit Patel
(74) *Attorney, Agent, or Firm*—Dickstein, Shapiro, LLP.

(57) ABSTRACT

To construct a system abundant in scalability in which the devices are increased or decreased in a minimum unit in accordance with the amount of user data to be processed by dividing the UPE (user plane control equipment) in a radio network controller into the minimum necessary functions, a MAC-d entity only dependent on the individual user data is separated independently from a MAC-c/sh entity so that it may be increased or decreased in accordance with the amount of traffic. Thereby, the unit of increase or decrease can be made not a unit of UPE but a finer unit of MAC-d, resulting in the higher scalability of the system.

11 Claims, 6 Drawing Sheets

RADIO NETWORK CONTROLLER AND MOBILE COMMUNICATION SYSTEM USING THE SAME

BACKGROUND OF THE INVENTION

1. Field of the Invention

The present invention relates to a radio network controller and a mobile communication system using the radio network controller, and more particularly to improvements in a radio network controller (RNC) in a mobile communication system of a W-CDMA cellular scheme.

2. Description of the Prior Art

FIG. 4 shows an architecture of a W-CDMA communication system that is a mobile communication system. A radio access network (RAN) 1 comprises the radio network controllers (RNC) 4, 5, and a plurality of nodes (Node B) 6 to 9, and is connected via Iu interfaces to a core network (CN) 3 that is a switching network. The nodes (Node B) 6 to 9 mean a logical node for performing the radio transmission and reception, and are more specifically a radio base station apparatus.

An interface between the Node B and the RNC is called Iub, and an Iur interface is also defined as an interface between each RNC. Each Node B covers one or more cells 10, and is connected via a radio interface to a mobile unit (UE) 2. Node B terminates a radio link, and the RNC manages Node B and selects and composes the radio paths at the time of soft hand over. The details of the architecture as shown in FIG. 4 are defined in 3GPP (3rd Generation Partnership Project).

FIG. 5 shows a protocol architecture of the radio interface in the W-CDMA communication system as shown in FIG. 4. As shown in FIG. 5, this protocol architecture comprises three protocol layers, including a physical layer (PHY) 11 denoted as L1, the data link layers 12 to 14 denoted as L2, and a network layer (RRC: Radio Resource Control) 15 denoted as L3.

The data link layer of L2 is divided into three sub-layers, including a MAC (Media Access Control) layer 12, an RLC (Radio Link Control) layer 13, and a BMC (Broadcast/Multicast Control) layer 14. Also, the MAC layer 12 has a MAC-c/sh (common/shared) 121 and a MAC-d (dedicated) 122, and the RLC layer 13 has a plurality of RLCs 131 to 134.

In FIG. 5, ellipses denote service access points (SAP) between layers, or between sub-layers, in which the SAP between the RLC sub-layer 13 and the MAC sub-layer 12 provides a logical channel. That is, the logical channel is provided from the MAC sub-layer 12 to the RLC sub-layer 13, classified according to the function of transmission signal or the logical characteristic, and featured by the contents of transferred information.

Examples of the logical channel include CCCH (Common Control Channel), PCCH (Paging Control Channel), BCCH (Broadcast Control Channel), and CTCH (Common Traffic Channel).

The SAP between the MAC sub-layer 12 and the physical layer 11 provides a transport channel. That is, the transport channel is provided from the physical channel 11 to the MAC sub-layer 12, classified according to the form of transmission, and featured by the kind of information transmitted via the radio interface and the transfer mode.

Examples of the transport channel include PCH (Paging Channel), RACH (Random Access Channel), DCH (Dedicated Channel), BCH (Broadcast Channel), and FACH (Forward Access Channel). The details of the MAC sub-layer 12 and its relationship with the transport channel are disclosed in 3GPP TS25.321 V3.15.0 (2003, 03).

The physical layer 11 and each of the sub-layers 12 to 14 of the data link layer are controlled via a C-SAP providing a control channel on the network layer (RRC) 15. The details of the protocol architecture as shown in FIG. 5 are defined in 3GPP.

Also, in the prior art, there are a C (Control) plane for signaling to transfer the control signal and a U (User) plane for transferring the user data, in which the BMC sub-layer 14 of L2 is only applied to the U plane.

BRIEF SUMMARY OF THE INVENTION

The RNC 4, 5 of the conventional radio access network (RAN) 1 has a function of controlling the C plane and a function of controlling the U plane, which are physically integrated.

In a mobile communication system having the conventional RNC in which both the control functions of U plane and C plane are integrated, to enhance the processing ability of signaling, it is only necessary to add the control function of C plane, but the RNC itself must be also added. Also, to enhance the processing ability of user data, it is only necessary to add the control function of U plane, but the RNC itself must be also added. Accordingly, with the conventional RNC constitution, it is difficult to construct a system abundant in scalability.

Thus, in such a radio network, it is considered that the C plane control function and the U plane control function are separated, in which the U plane control function can be added in accordance with the amount of user data to be processed, but necessarily comprises the MAC sub-layer 12 indispensable for the transfer control of user data. The MAC sub-layer 12 comprises the functions of the MAC-c/sh 121 and the MAC-d 122, as shown in FIG. 5. Hence, it is necessary to add the U plane control function comprising both the MAC-c/sh 121 and the MAC-d 122 in accordance with the amount of user data to be processed.

Thus, it is an object of the invention to provide a radio network controller that can construct a system abundant in scalability in which the equipments are increased or decreased in accordance with the amount of user data to be processed by dividing the U plane control function into the minimum necessary functions, and a mobile communication system using the radio network controller.

The present invention provides a radio network controller provided between a radio base station and a switching network in a mobile communication system, wherein a first functional part dealing with a dedicated channel in a radio network is provided separately from a second functional part dealing with other channels than the dedicated channel.

Also, the invention provides a mobile communication system comprising a radio base station, a switching network, and a radio network controller provided between the radio base station and the switching network, wherein a first functional part dealing with a dedicated channel in a radio network is provided separately from a second functional part dealing with other channels than the dedicated channel in the radio network controller.

The operation of the invention will be described below. The radio network controller (RNC) in the W-CDMA communication system has the control plane control equipment (CPE) for controlling the signaling and the user plane control equipment (UPE) for controlling the user data, but the latter UPE is provided with a MAC-d entity dealing with the dedicated channel and a MAC-c/sh entity dealing with other common channel. The latter MAC-c/sh entity is closed related with the cell of the Node B, and has an important function that is necessarily specified in originating or receiving a call. Also, the former MAC-d entity only depends on the dedicated user data for each mobile terminal. Both entities have different functions.

Thus, in this invention, the MAC-d entity only dependent on the individual user data is separated independently from the MAC-c/sh entity so that it may be increased or decreased depending on the amount of traffic. Thereby, the unit of increase or decrease can be made not a unit of UPE but a finer unit of MAC-d, resulting in the higher scalability of the system.

DETAILED DESCRIPTION OF THE PREFERRED EMBODIMENTS

Figure 6:
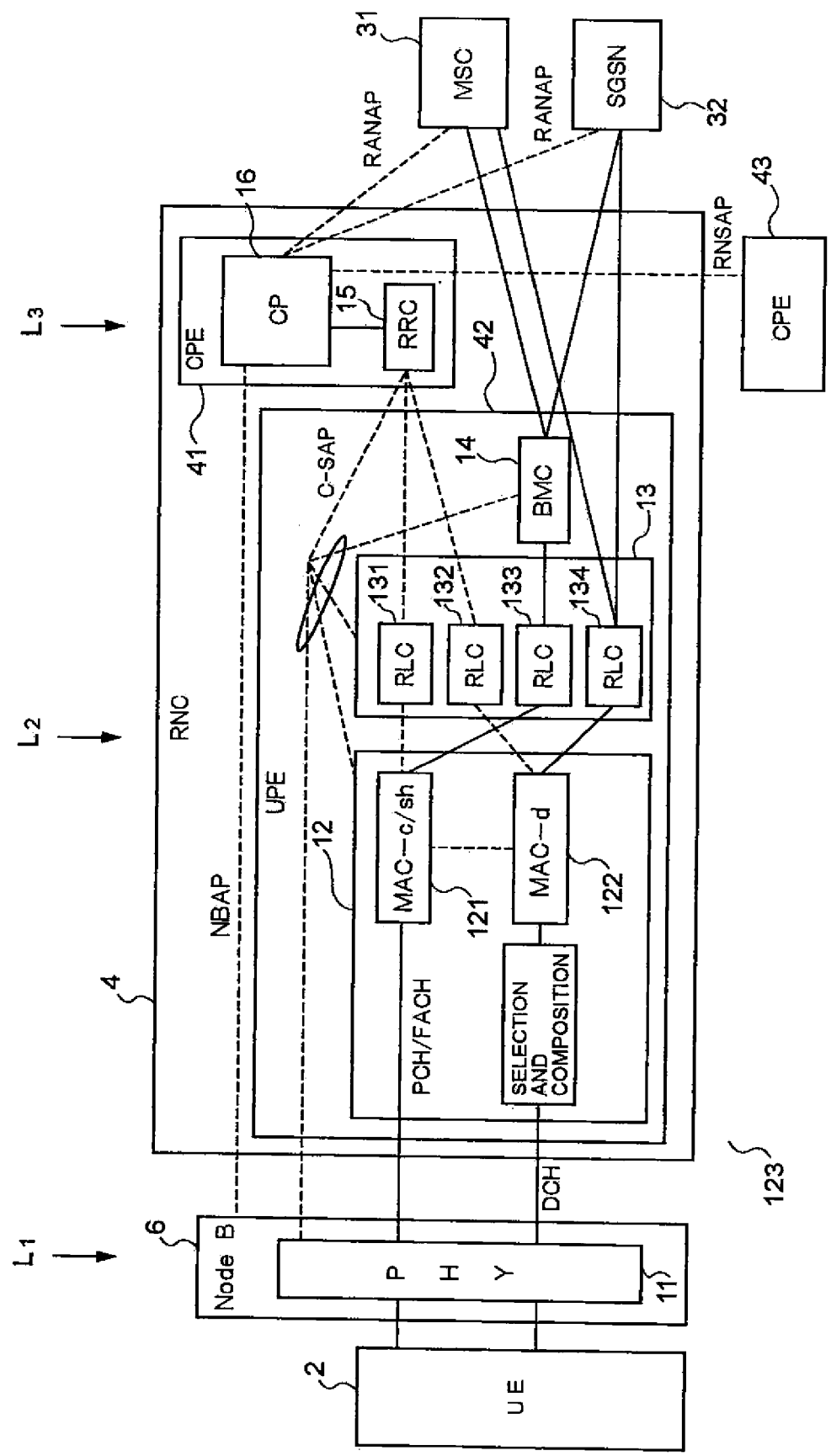
FIG. 6 is a functional block diagram of the protocol architecture of the W-CDMA communication method when the U plane equipment and the C plane equipment presumed in the invention are separated.

The preferred embodiments of the present invention will be described below in detail. FIG. 6 is a block diagram of an RNC in the case where a C plane control function and a U plane control function are separated. The details of a technique for separating the C plane control function and the U plane control function were described in Japanese Patent Application No. 2002-154889 as filed by the present applicant.

Referring to FIG. 6, the RNC 4 is separated into the C plane control equipment (CPE: Control Plane Equipment) 41 corresponding to C plane controlling the signaling and the U plane control equipment (UPE: User Plane Equipment) 42 corresponding to U plane controlling the user data, wherein the same or like parts are designated by the same symbols as in FIG. 5.

All the signaling is directly made between the equipment and a Control Processor (CP) 16 provided within the C plane control equipment 41. However, since the RRC signaling between a mobile unit (UE) 2 and the RNC 4 is not distinctly separated into the C plane and the U plane, it is transferred to an RRC 15 within the C plane control equipment 41, after the RLCs 131 and 132 are terminated within the U plane control equipment 42.

Figure 5:
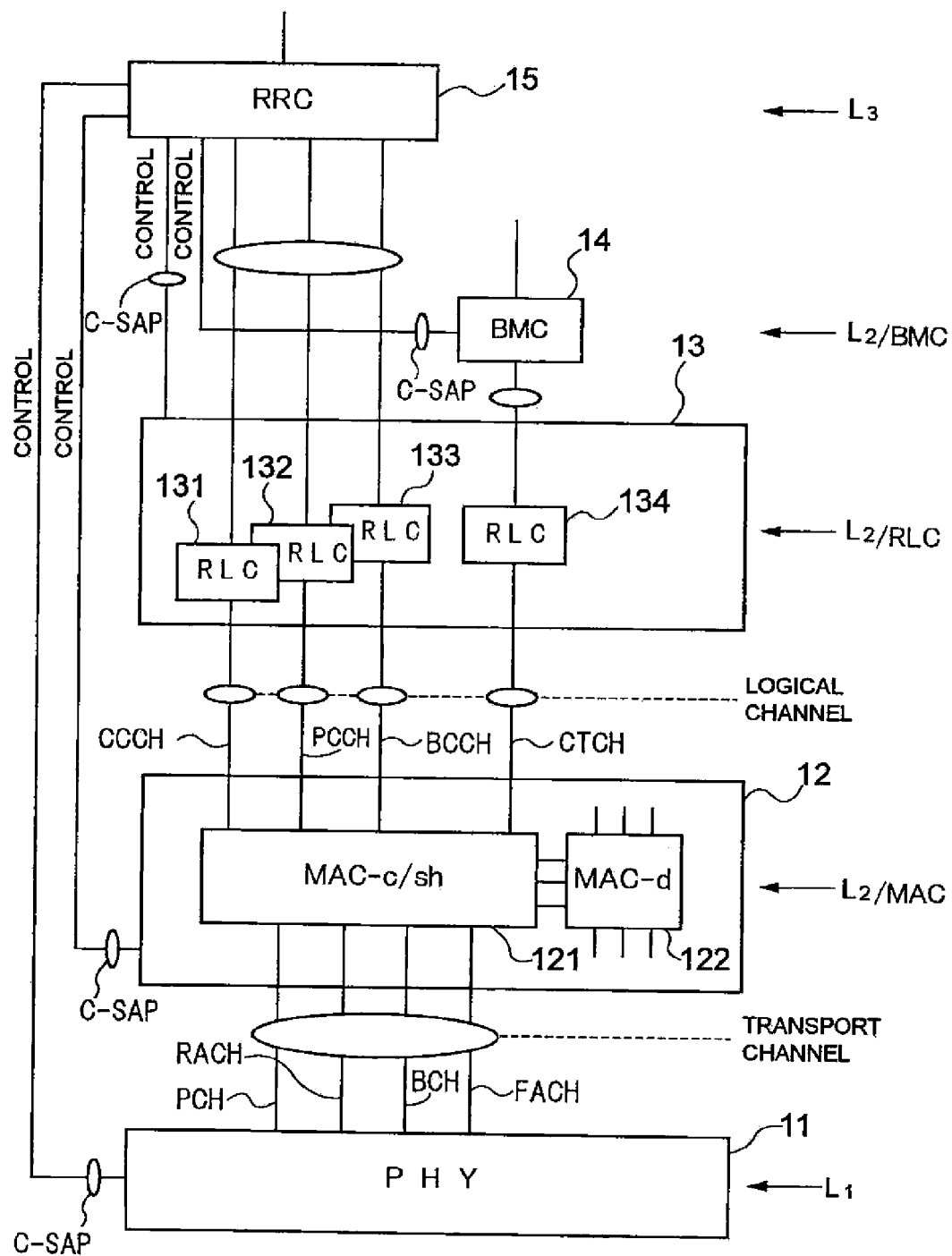
FIG. 5 is a diagram showing the system architecture of FIG. 4 as a protocol architecture.

In this way, in the protocol layer architecture of the existing RNC as shown in FIG. 5, a physical layer (PHY) 11 denoted as L1 is separated into the Node B (radio base station apparatus) 6, the data link layers 12 to 14 denoted as L2 are separated into the U plane control equipment 42, and a network layer 15 denoted as L3 and its upper layers are separated into the C plane control equipment 41.

From the RRC 15 within the C plane control equipment 41, each device for terminating a physical layer 11 within Node B, and a MAC layer 12, an RLC layer 13 and a BMC layer 14 within the U plane control equipment 42 is controlled, employing a C-SAP (Control Service Access Point) providing a control channel. The signaling NBAP between Node B 6 and the RNC 4, the signaling RNSAP between the RNC 4 and the C plane control equipment (CPE) 43 within the other RNC, and the signaling RANAP between the RNC 4 and an MSC (Mobile Switching Center) 31 or an SGSN (Serving GPRS (Global Packet Radio Service) Switching Node) 32 are directly terminated and processed by the CP 16 within the C plane control equipment 41.

Figure 4:
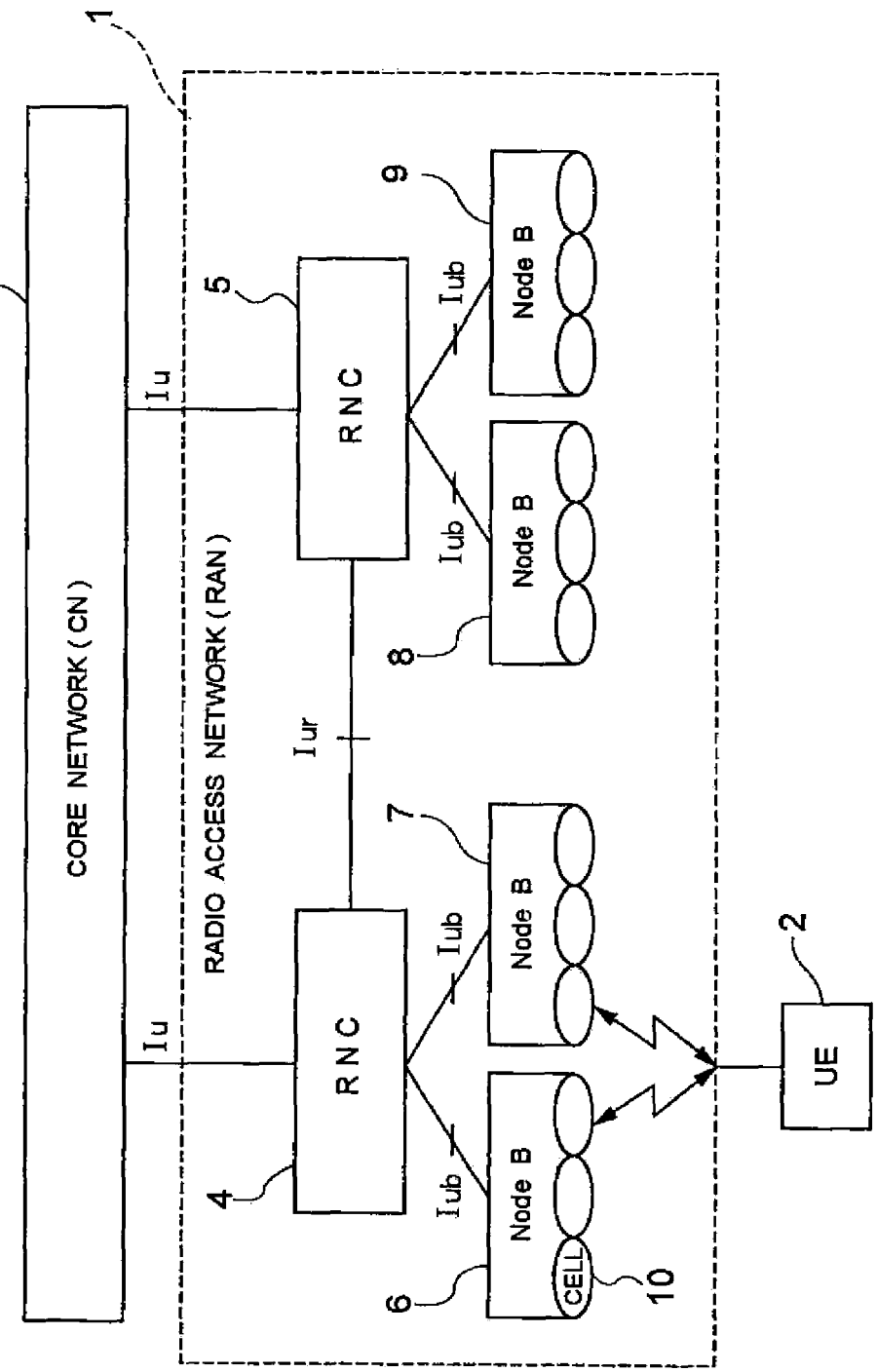
FIG. 4 is a diagram showing a system architecture of the W-CDMA communication method.

The MSC 31 has a circuit switching capability, and the SGSN 32 has a packet switching function. They are included in a core network (CN) 3 as shown in FIG. 4. Also, the RRC signaling used between the RNC 4 and the mobile unit 2 is terminated in the RRC layer 15 within the C plane control equipment 41 from the mobile unit 2 via Node B 6 and the MAC layer 12 and the RLC layer 13 within the U plane control equipment 42. PCH/FACH is terminated in the MAC-c/sh layer 121 and the RLC layer 13 within the U plane-control equipment 42, and transmitted to the C plane control equipment 41.

A DCH (Dedicated Channel) transmitting the user data connects any Node B with the U plane control equipment 42, and is terminated in the MAC-d layer 122 and the RLC layer 13 after a path linking a plurality of the Node B is selected and composed by a selection and composition part 123 within the U plane control equipment 42, and transmitted to the MSC 31 having a circuit switching capability via the C plane control equipment 41 and the SGSN 32 having a packet switching function.

The selection and composition part 123 selects and composes the DCHs from the plurality of the Node B at the time of soft hand over, selects a channel having the most excellent channel quality (received quality) from the plurality of the Node B and sends it to the core network (CN) at the upper level.

With this equipment constitution, the system abundant in scalability is constructed. That is, when the processing capability of signaling is improved, the C plane control equipment 41 is only added, or when the user data transfer rate is improved, the user plane control equipment 42 is only added. Also, the devices within the U plane control equipment 42 may be installed as independent units, because they are irrelevant with each other, and controlled by the RRC 15 within the C plane control equipment 41.

In the case where the C plane control equipment and the U plane control equipment are separated, the U plane control equipment 42 may be only increased in accordance with the amount of data, when there is a great amount of user data to be processed. However, the U plane control equipment 42 has, besides a function of the MAC-d 122 (defined as entity in the 3GPP document) dealing with the DCH (Dedicated Channel) that is the dedicated channel for transferring the user data, a function (entity) of the MAC-c/sh 121 dealing with PCH, FACH, RACH (Random Access Channel), CPCH (Common Packet Channel), DSCH (Downlink shared channel), and USCH (Uplink shared Channel).

Figure 1:
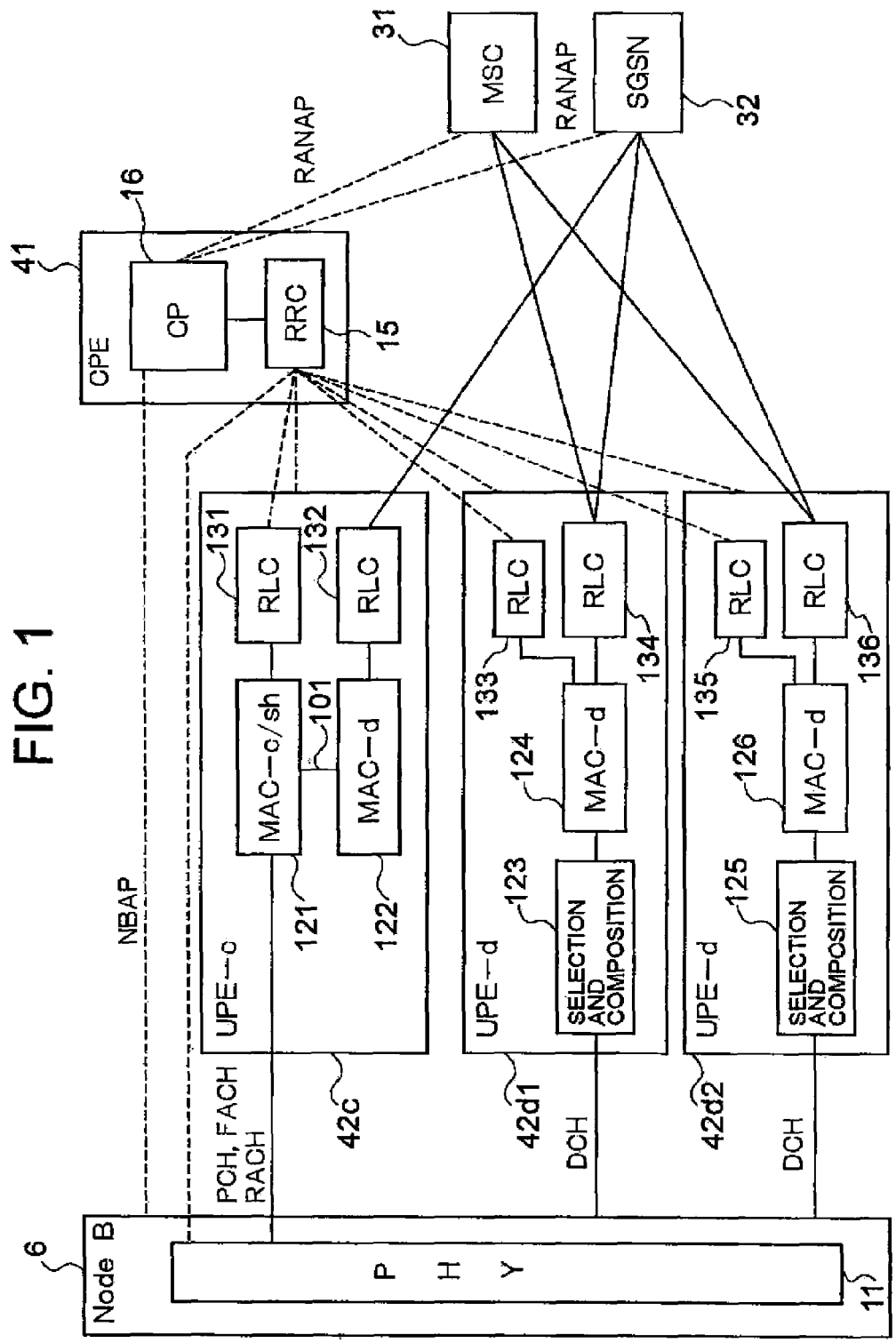
FIG. 1 is a block diagram of a radio network controller according to an embodiment of the present invention.

When there is a great amount of data to be processed, the system abundant in scalability can be constructed if the MAC-d functional part dealing with the DCH is only increased accordingly. Thus, the RAN configuration as shown in FIG. 1 is provided as the embodiment of the invention. In FIG. 1, the same or like parts are designated by the same symbols as in FIG. 6.

Referring to FIG. 1, two equipments 42d1, 42d2 (denoted as UPE-d) having the MAC-d dealing with the DCH alone among the transport channels and one equipment 42c (denoted as UPE-c) having the MAC-c/sh dealing with other transport channels other than the DCH are provided. That is, the U plane control equipment (UPE) 42 as shown in FIG. 6 is separated into one UPE-c (42*c*) and two UPE-d (42*d*1, 42*d*2) in this embodiment.

The UPE-d 42*d*1 is provided with the selection and composition part 123, the MAC-d 124, and RLC 133, 134 that are the upper-level sub-layers of the MAC-d. Also, the UPE-d 42*d*2 is provided with a selection and composition part 125, a MAC-d 126, and RLC 135, 136 that are upper-level sub-layers of the MAC-d. When the RRC 15 employs the DCH, the RLC 133 and 135 are employed, though the RLC 133 and 135 are not directly related with the invention. The UPE-c 42*c* is provided with the RLC 131 that is the upper-level sub-layer of the MAC-c/sh, the MAC-d 122 and the RLC 132 that is the upper-level sub-layer of the MAC-d.

The MAC-d and the RLC, as well as the MAC-c/sh and the RLC are in the one-to-one relation, and can not be separated, whereby each MAC sub-layer and the RLC sub-layer are paired. Also, in the UPE-C 42*c*, there is a line 101 between the MAC-c/sh 121 and the MAC-d 122. This line 101 is employed in the following way.

That is, when there is a small amount of data in a PS (Packet Switched) call, a common channel through the MAC-c/sh may be employed, instead of the dedicated channel through the MAC-d, as described in the 3GPP document. Therefore, the data regarding the PS call is transferred from the SGSN 32 having the PS switching function via the RLC 132 and the MAC-d 122 and further via the line 101 through the common channel dealt with by the MAC-c/sh 121 to the UE, not shown. When there is a great amount of data regarding the PS call, the UPE-d 42*d*1 and 42*d*2 are employed between the UE and the SGSN 32.

The UPE-c 42*c* terminates the MAC-c/sh 121 paired with the cell information (cell ID that is an identifier for identifying the cell) managed by Node B6, in which the MAC-c/sh 121 has a function for relaying the signaling that is important for call connection such as PCH, FACH or RACH. This signaling is transmitted to the CPE 41 at the upper level by terminating all the RLCs within this equipment UPE-c 42*c*. The UPE-d 42*d*1, 42*d*2 terminate the MAC-d of the dedicated channel (DCH) for transferring the user data. In FIG. 1, the BMC 14 as shown in FIG. 6 is omitted.

Figure 2:
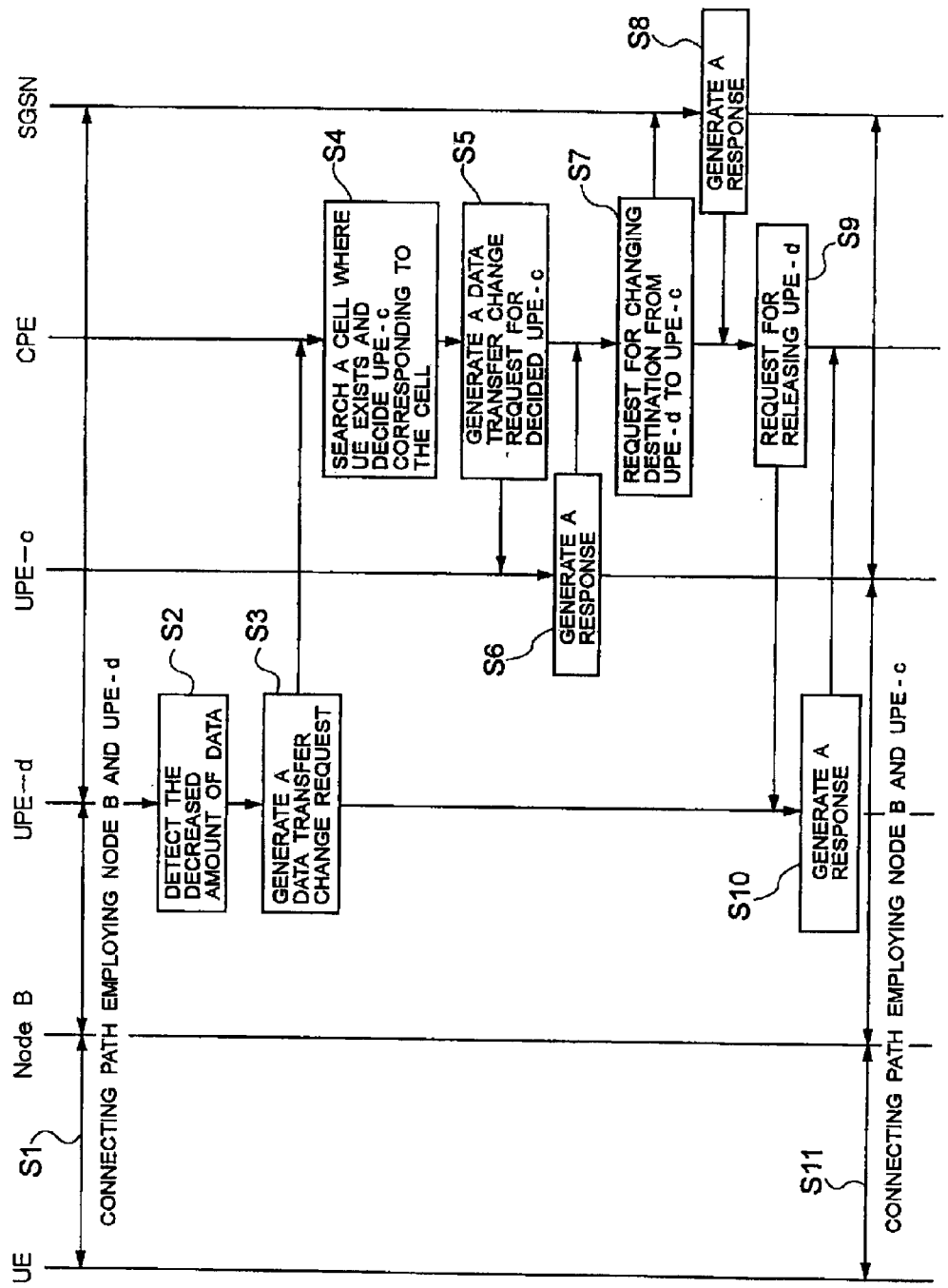
FIG. 2 is a sequence diagram showing the operation of the embodiment of the invention, when the data amount of PS call is decreased.
Figure 3:
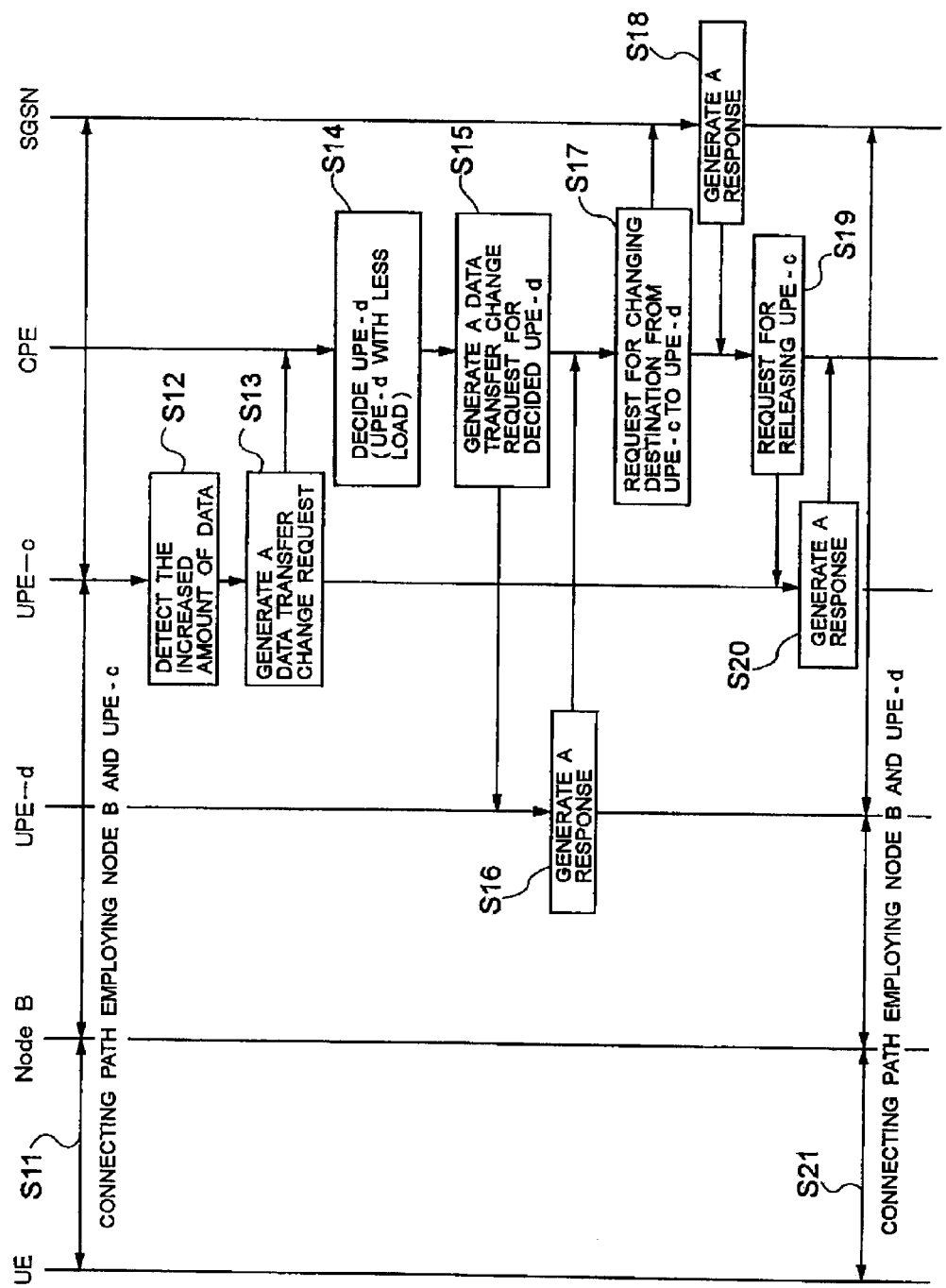
FIG. 3 is a sequence diagram showing the operation of the embodiment of the invention, when the data amount of PS call is increased.

In the PS call, the common channel dealt with by the MAC-c/sh or the dedicated channel dealt with by the MAC-d may be employed depending on the amount of data per unit time. That is, when there is a great amount of data, the dedicated channel dealt with by the MAC-d is employed, or when there is a small amount of data, the common channel dealt with by the MAC-c/sh is employed, by switching between the dedicated channel and the common channel, as described above. Thus, in the invention, the UPE-c (42*c*) and the UPE-d (42*d*1, 42*d*2) are switched depending on the amount of data. FIGS. 2 and 3 show the operation sequence in this case.

FIG. 2 is a diagram showing the operation sequence of the embodiment of the invention. The UE (not shown) existing in a cell managed by the Node B6 is making a path connection regarding a PS call, employing the Node B6 and the UPE-d (e.g., 42*d*1 in FIG. 1) (step S1). It is supposed that the packet data are being transferred through this path between the UE and the SGSN 32 on the core network side.

In this state, if the amount of packet data is decreased to or below a predetermined threshold, the small amount of the packet data is detected by the RLC 134 (step S2). The detection of the decreased amount of data may be made by the MAC-d 124. In response to detection of the decreased amount of data, a data transfer change request is generated by the RLC 134 (step S3). That is, a request for changing the data transfer with the UPE-d to the data transfer with the UPE-c is generated. This data transfer change request is transmitted to the CPE 41 at the upper level.

The CPE 41 detects cell information of the cell where the UE exists, selects the UPE-c paired with the cell, and decides the UPE-c (UPE-c 42*c* in this example) as the equipment to be switched (step S4). In this case, the CP 16 of the CPE 41 has the information representing a correspondence relation between the cell and the UPE-c, which is set up by the operator in designing the system. Herein, when the UE registers the position, the cell information of the cell where the UE exists at present is notified to the RNC side, or the CPE 41, based on the cell information received from the Node B6, whereby the CPE 41 knows the cell where the UE exists.

The CPE 41 generates a data transfer change request for the decided UPE-c and transmits it (step S5). The UPE-c 42*c* receiving this data transfer change request generates a response, and returns it to the CPE 41 (step S6). The CPE 41 waits for this response, and requests the SGSN 32 to change the destination of data from the UPE-d 42*d*1 to the UPE-c 42*c* (step S7).

In this case, supposing that the devices of MSC, SGSN, CPE, UPE-c, and UPE-d as shown in FIG. 1 are connected via an IP (Internet Protocol) network, each device is preassigned an IP address. Hence, the CPE 41 instructs the SGSN 32 to change the destination IP address of each data packet for the PS call from the IP address of the UPE-d 42*d*1 to the IP address of the UPE-c 42*c*.

The SGSN 32 generates a response to this destination change request and transmits it to the CPE 41 (step S8). Waiting for this response, the CPE 41 makes a request for releasing the dedicated channel of the UPE-d 42*d*1 (step S9). The UPE-d 42*d*1 accepts this release request, generates its response and returns it to the CPE 41 (step S10). And the dedicated channel is released in the UPE-d 42*d*1. As a result, the transfer of data packet between the UE and the SGSN 32 is performed employing a path on the common channel of the UPE-c 42*c* (step S11). In this case, within the UPE-c 42*c*, the packet data are transferred through the path from the MAC-c/sh 121 via the line 101 to the MAC-d 122 and the RLC 132.

FIG. 3 is a diagram showing the operation sequence of the embodiment of the invention. The UE (not shown) existing in a cell managed by the Node B6 is making a path connection regarding a PS call, employing Node B6 and UPE-c 42*c* (step S11). It is supposed that the packet data are being transferred through this path between the UE and the SGSN 32.

In this state, if the amount of packet data is increased beyond the predetermined threshold, the large amount of the packet data is detected by the RLC 132 (step S12). In response to detection of the increased amount of data, a data transfer change request is generated by the RLC 132 (step S13). That is, a request for changing the data transfer with the UPE-c to the data transfer with the UPE-d is generated. This data transfer change request is transmitted to the CPE 41.

At this time, the CPE 41 can select any UPE-d. An exemplary method of selecting the UPE-d involves selecting the UPE-d with smaller load, whereby the load of each UPE-d can be equalized (step S14). As a criterion for determining the amount of load, whether the number of calls or the amount of data is large or small is assessed. The former number of calls is grasped by the CPE 41. Also, the amount of data is grasped by the CPE when each UPE-d notifies the amount of data to the CPE at every predetermined period. In this UE, when a CS (Circuit Switched) call is also connected together with the PS call, the UPE-d employing the CS call is selected.

The CPE 41 generates a data transfer change request for the UPE-d selected and decided in this way and transmits it (step S15). The UPE-d receiving this data transfer change request generates a response, and transmits it to the CPE 41 (step S16). Waiting for this response, the CPE 41 transmits a request for changing the destination of data packet from the UPE-c to the UPE-d to the SGSN 32 (step S17). The CPE 41 waits for a response from the SGSN 32 (step S18), and makes a channel release request for the UPE-c to transfer data to the UE (step S19). A response to this request is returned from the UPE-c (step S20). Thereby, the transfer of data packet between the UE and the SGSN 32 is performed, employing a path on the dedicated channel of the UPE-d (step S21).

In the sequences of FIGS. 2 and 3, in switching from the UPE-c to the UPE-d, and vice versa, there is the possibility that the data flows to alter the sequence of data, or cause data slip (or drop). In this case, data slip may be avoided, employing a well-known method.

In the above embodiment, the UPE that is the user plane control equipment is provided with two UPE-d comprising the MAC-d dealing with the dedicated channel, separately from the MAC-c/sh dealing with the common channel, but the number of UPE-d is not limited to two, and may be arbitrarily set depending on the amount of user traffic. Also, the UPE-c has a function of relaying the signaling required for call connection, and may be provided corresponding to the cell, or one for a plurality of cells.

The operation flow of each equipment in the operation sequence as shown in FIGS. 2 and 3 may be stored beforehand in a recording medium such as ROM, and read and executed by a computer (CPU).

According to the invention, the MAC-d entity only dependent on the individual user data is separated independently from the MAC-c/sh entity so that it may be increased or decreased depending on the amount of traffic. Thereby, the MAC-d entity is increased or decreased in a unit of MAC-d, bringing about the effect that the scalability of the system is enhanced. Conventionally, the user plane control equipment (UPE) setting up a first call is employed until the end of the call, whereby there is a risk that the signaling employing the MAC-c/sh entity is pressed due to the increased amount of user data. However, in this invention, it is possible to switch from the MAC-c entity to the MAC-d entity due to the increased amount of data, whereby there is no risk as above.

What is claimed is:

1. A radio network controller provided between a radio base station and a switching network in a mobile communication system, the radio network controller comprising:
   at least one first functional part dealing with a dedicated channel in a radio network; and
   a second functional part, provided separately from said at least one first functional part, dealing with channels other than said dedicated channel,
   wherein said at least one first functional part has means for generating a request for switching to the data transfer employing the channel dealt with by said second functional part and outputting said request to a host apparatus, when the amount of transfer data in said dedicated channel is less than or equal to a predetermined value.

2. A radio network controller provided between a radio base station and a switching network in a mobile communication system, the radio network controller comprising:
   at least one first functional part dealing with a dedicated channel in a radio network; and
   a second functional part, provided separately from said at least one first functional part, dealing with channels other than said dedicated channel,
   wherein said second functional part has means for generating a request for switching to the data transfer employing said dedicated channel dealt with by said at least one first functional part and outputting said request to a host apparatus, when the amount of data transfer in the channel dealt with by the second functional part is greater than the predetermined value.

3. The radio network controller according to claim 2, wherein said host apparatus is control plane control equipment for controlling the signaling.

4. The radio network controller according to claim 3, wherein an apparatus comprising said first and second functional parts is provided separately from said control plane control equipment, and contained in the user plane control equipment for controlling the user data.

5. A mobile communication system comprising a radio base station, a switching network, and a radio network provided between said radio base station and said switching network, the radio network controller comprising:
   at least one first functional part dealing with a dedicated channel in a radio network; and
   a second functional part, provided separately from said at least one first functional part, dealing with channels other than said dedicated channel,
   wherein said at least one first functional part has means for generating a request for switching to the data transfer employing the channel dealt with by said second functional part and outputting said request to a host apparatus, when the amount of transfer data in said dedicated channel is less than or equal to a predetermined value.

6. The mobile communication system according to claim 5, wherein said host apparatus comprises means for requesting an exchange network to change a destination of said transfer data from said at least one first functional part to said second functional part in response to said request.

7. The mobile communication system according to claim 5, wherein said second functional part has means for generating a request for switching to the data transfer employing the dedicated channel dealt with by said at least one first functional part and outputting said request to a host apparatus, when the amount of transfer data in the channel dealt with by the second functional part is greater than the predetermined value.

8. The mobile communication system according to claim 7, wherein said host apparatus comprises means for requesting said switching network to change a destination of said transfer data from said second functional part to said at least one first functional part in response to said request.

9. The mobile communication system according to claim 8, wherein, when said at least one first functional part comprises more than one first functional parts said means for said host apparatus selects one of the first functional parts having smaller load in changing the destination of said transfer data.

10. The mobile communication system according to claim 5, wherein said host apparatus is control plane control equipment for controlling the signaling.

11. The mobile communication system according to claim 10, wherein an apparatus comprising said first and second functional parts is provided separately from said control plane control equipment, and contained in the user plane control equipment for controlling the user data.

* * * * *